INVENTORS
JOHN B. LEVIN
NICHOLAS REPELLA
MILTON ROSEN

BY Joseph Weingarten
ATTORNEY

RADAR DATA PROCESSING

Filed June 2, 1955 7 Sheets-Sheet 2

*INVENTORS*
JOHN B. LEVIN
NICHOLAS REPELLA
MILTON ROSEN
*BY* Joseph Weingarten
*ATTORNEY*

INVENTORS
JOHN B. LEVIN
NICHOLAS REPELLA
MILTON ROSEN
BY Joseph Weingarten
ATTORNEY

*INVENTORS*
JOHN B. LEVIN
NICHOLAS REPELLA
MILTON ROSEN

BY Joseph Weingarten
*ATTORNEY*

INVENTORS
JOHN B. LEVIN
NICHOLAS REPELLA
MILTON ROSEN
BY Joseph Weingarten
ATTORNEY

INVENTORS
JOHN B. LEVIN
NICHOLAS REPELLA
MILTON ROSEN
BY
ATTORNEY

INVENTORS
JOHN B. LEVIN
NICHOLAS REPELLA
MILTON ROSEN
BY Joseph Weingarten
ATTORNEY United States Patent Office 2,964,745
Patented Dec. 13, 1960

2,964,745

RADAR DATA PROCESSING

John B. Levin, Cambridge, Nicholas Repella, Natick, and Milton Rosen, Norwood, Mass., assignors to Laboratory for Electronics, Inc., Boston, Mass., a corporation of Delaware Filed June 2, 1955, Ser. No. 512,665
19 Claims. (Cl. 343—11)

The present invention relates in general to precision approach radar systems, and more particularly concerns a novel analog computer and associated apparatus, requiring a minimum of circuit components and adjustment procedures, whose function is the generation and visual display of a pair of course lines related to the projection in the horziontal and vertical planes of a selected aircraft landing path.

Basically, a precision approach radar (PAR) for aircraft landing guidance under low visibility conditions employs elevation and azimuth antennas scanning intersecting sectors in the vertical and horizontal planes for the determination of elevation, azimuth and range information. One technique for visually displaying this information utilizes a cathode ray tube beta-scan, which comprises elevation and azimuth B-scans, the former arranged above the latter. The aircraft position is determined by observing the echo signal in relation to electronically generated range markers and course lines. By appropriate instructions the aircraft may be directed to maneuver so as to maintain its position upon the predetermined glide path as indicated by the echo signal being centered on the course line in each B-scan display.

Safety and others reasons require that the radar antenna system normally be offset from the touchdown point where the glide path terminates. In electronically generating the proper elevation and azimuth course lines, the computer must account for the distance the antenna system is from the touchdown point, the orientation of the runway centerline in the sector searched by the antenna, and the glide slope angle of the glide path.

Heretofore, the approach to the generation and display of elevation and azimuth course lines has involved the derivation of distinctive equations defining each line, and their solution in separate computers provided for this function. Since in precision approach radar systems, azimuth and elevation sectors are scanned and displayed alternately, one or the other of the two course line computers would at any time reside in an inactive state. Not only does such an arrangement represent inefficient usage of electronic equipment, but system reliability is materially lowered through the need for components and circuits which are not always in service.

In accordance with the broad concepts of the present disclosure, aircraft landing geometry has been resolved in a novel manner so that similar equations become applicable for specification of both azimuth and elevation course lines. This, in turn makes it possible to utilize precisely the same computation techniques for each, and a primary object of this invention is thus, to provide a single time-shared computer for the alternate generation of azimuth and elevation course lines.

The copending application of Cole, Levin and Repella, Serial No. 487,372 filed February 10, 1955, for Radar Guidance System, discloses a precision approach radar antenna system which permits landings to be accommodated from either end of the runway, in one case the antenna system being to the left of the aircraft landing path; in the other, to the right. Since aircraft positional data is conveyed to the pilot in terms of aircraft deviation to the right or left of, and above or below the glide path, it is desirable that the display be arranged so that the orientation of the aircraft echo signals with respect to the course lines on the display remains unchanged with shifts in landing direction.

It is an object of this invention to accurately generate course lines oriented on the display with respect to the touchdown point the same as the glide path regardless of landing direction; that is, when the aircraft moves to the left of the glide path, the echo signal will be observed to move to the left of the course line on the azimuth display; when above the glide path, the echo signal will appear above the course line on the elevation display.

Another object of this invention is to provide means for generating an azimuth course line notwithstanding location of the antenna system on or very close to the runway centerline.

Still another object is to provide means for rapidly and accurately adjusting the generated azimuth course line to correspond to the projection of the glide path in the horizontal plane.

A further object is to electronically solve with one analog computer, each course line equation by relating a first variable quantity therein to the slope of a sawtooth signal, a second to a fixed value of the first quantity, another to a particular potential level, and a fourth to the time required for the sawtooth signal to rise to this level. It is another object of this invention to switch computer data inputs to provide solutions alternately useable in the elevation and azimuth B-scan displays.

These and other objects and advantages will become apparent from the following specification read with reference to the accompanying drawing in which.

Figure 7:
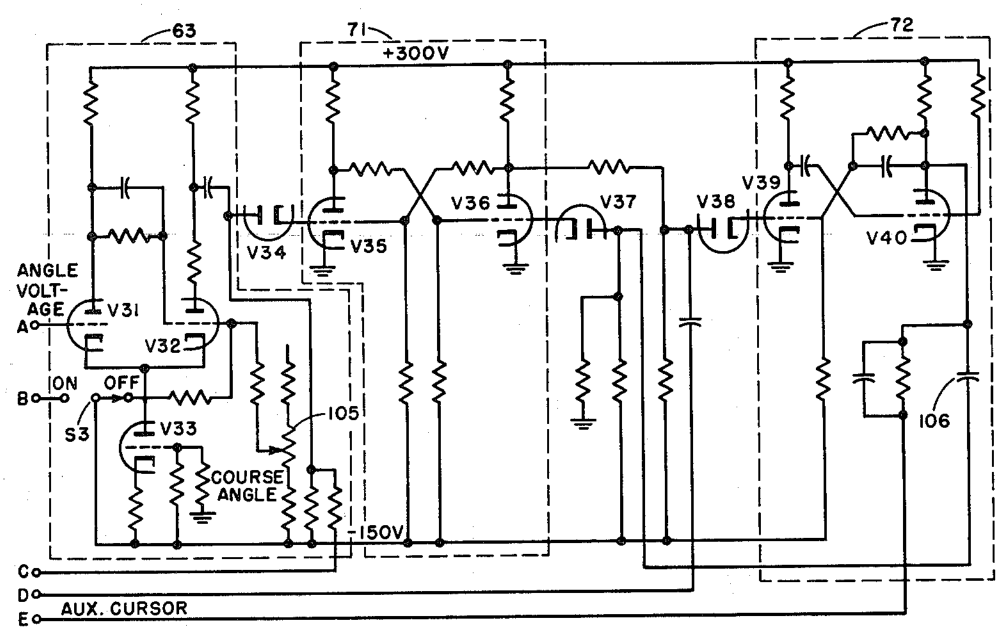
Figure 4:
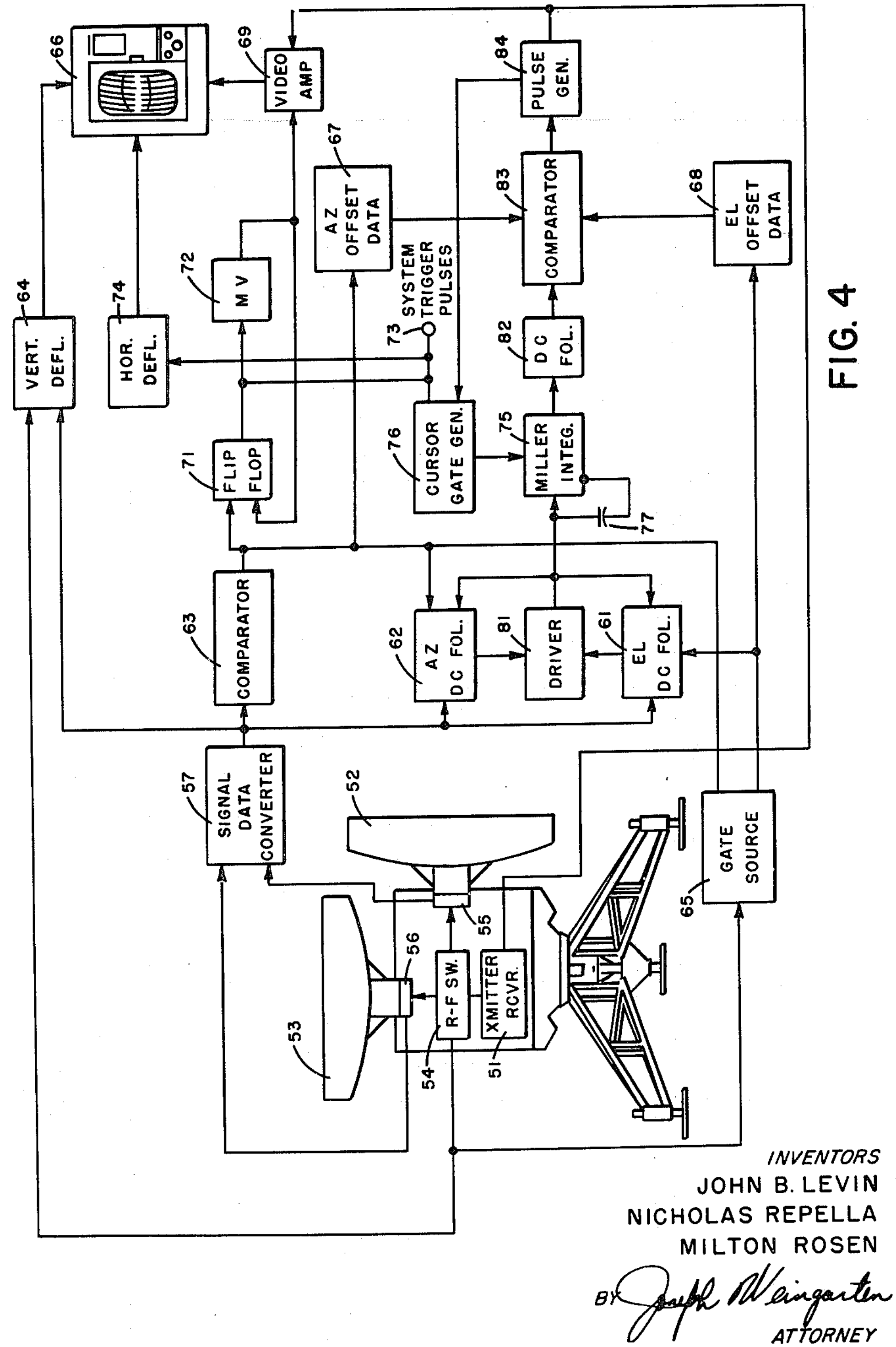
Fig. 4 is a combined block-pictorial diagram of an arrangement of apparatus for practicing the invention.
Figure 5:
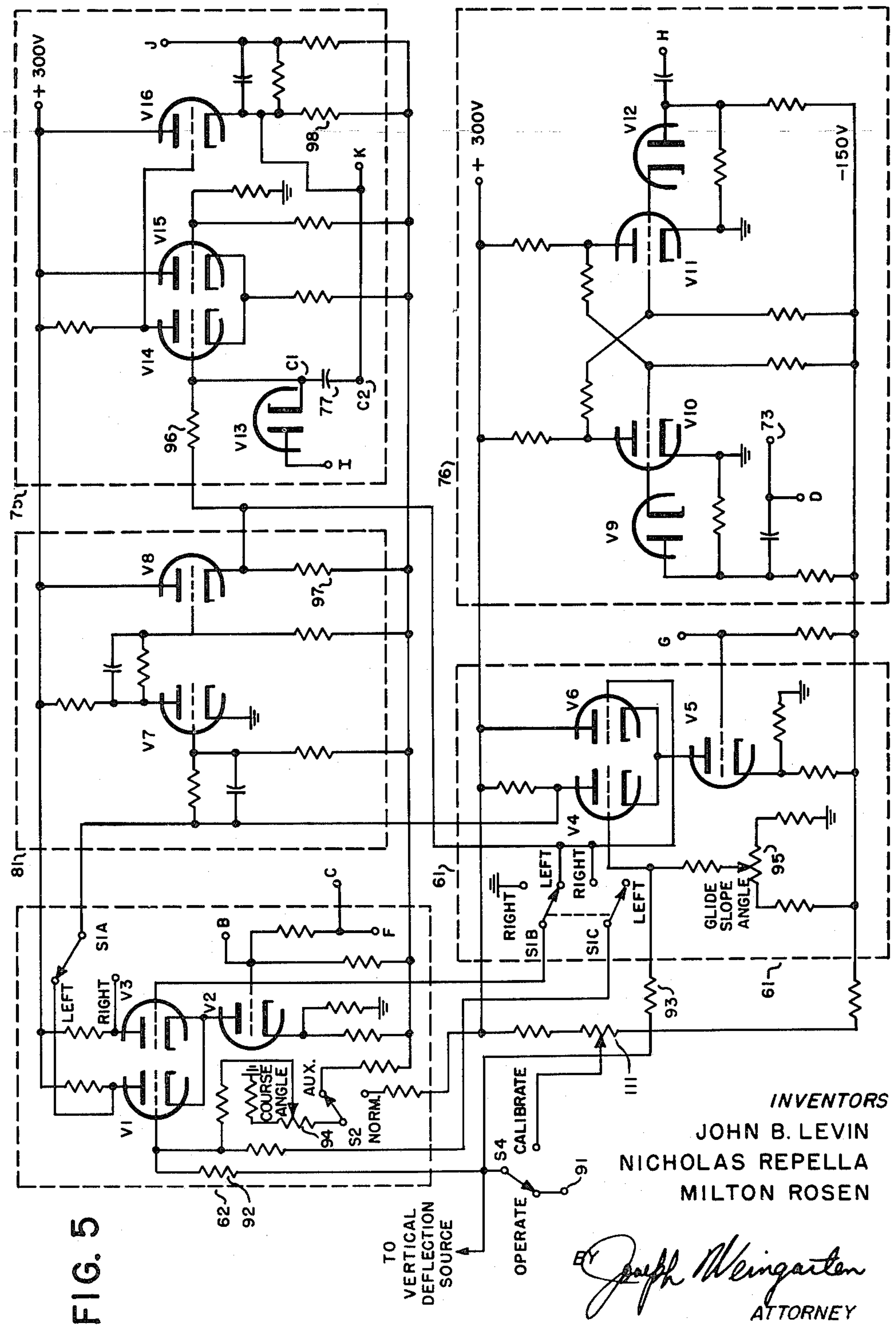
Figure 6:
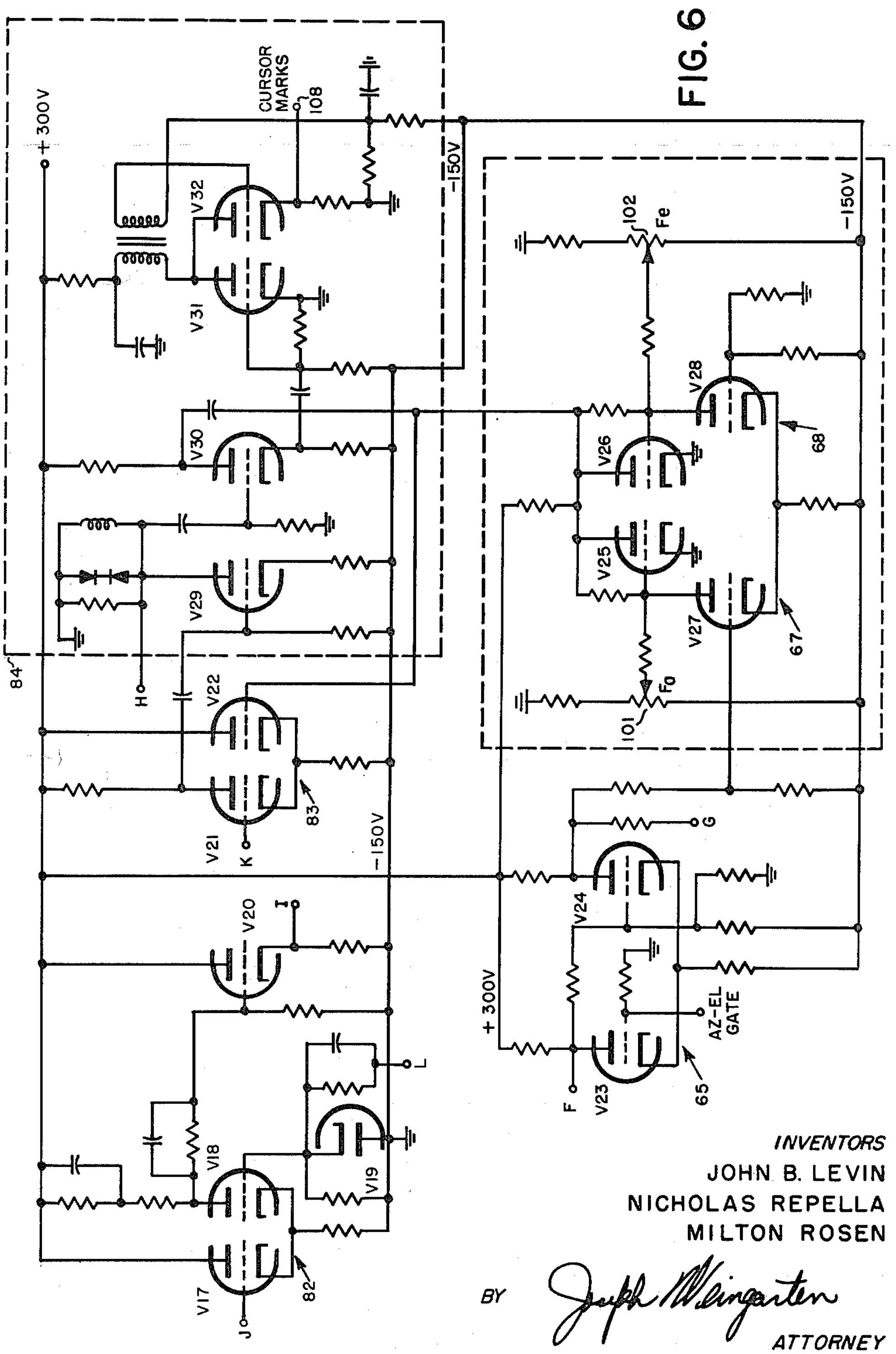

Figs. 5, 6 and 7 taken together comprise a schematic circuit diagram of portions of Fig. 4.

Figure 8:
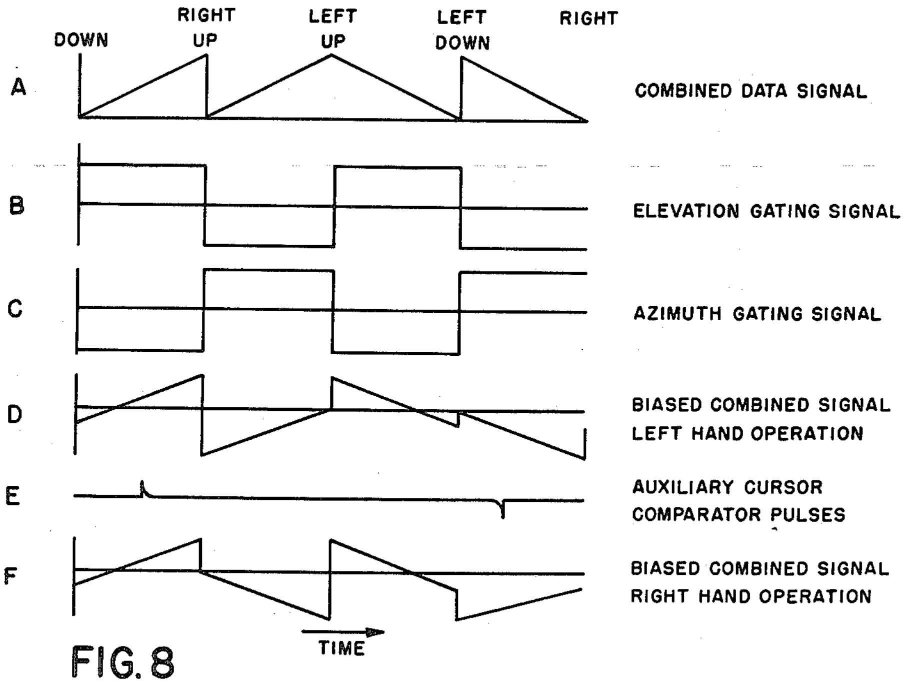
Figure 9:
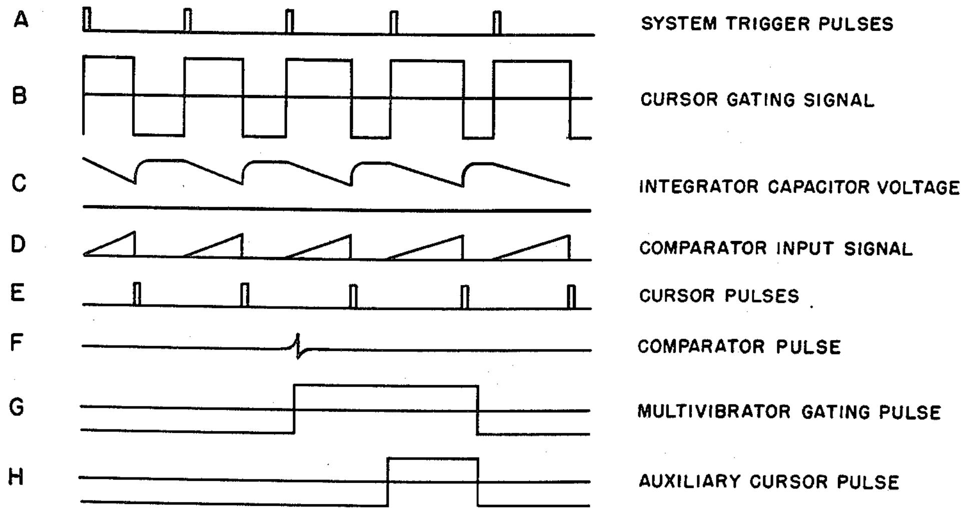

Figs. 8 and 9 are graphical representations of waveforms observed at various points in the circuits of Figs. 5, 6 and 7.

Figure 10:
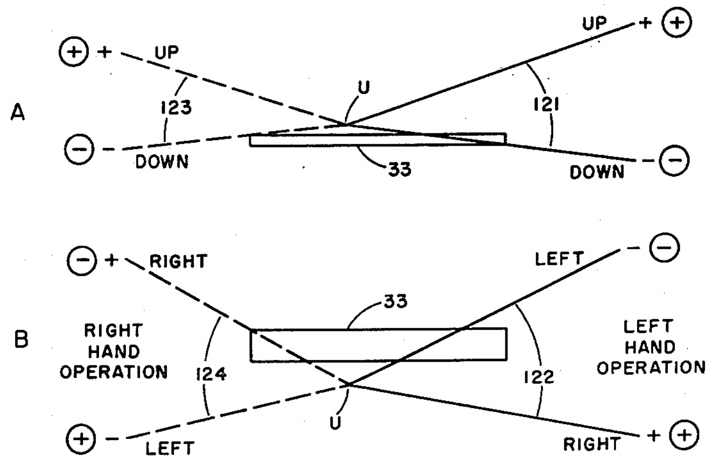

Figs. 10A and 10B are diagrammatic representations of the sectors scanned by the antennas together with symbols which characterize data signals for different modes of operation.

Figure 11:
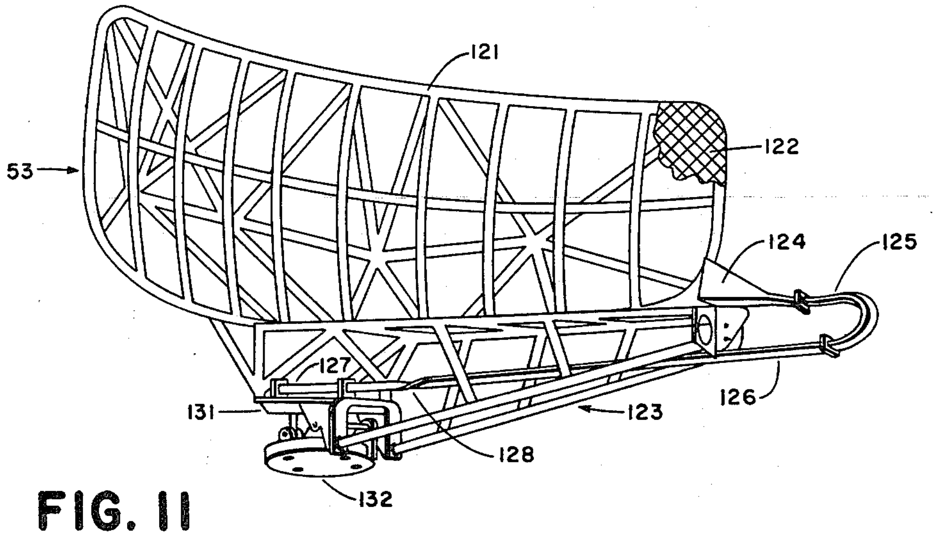
Figure 12:
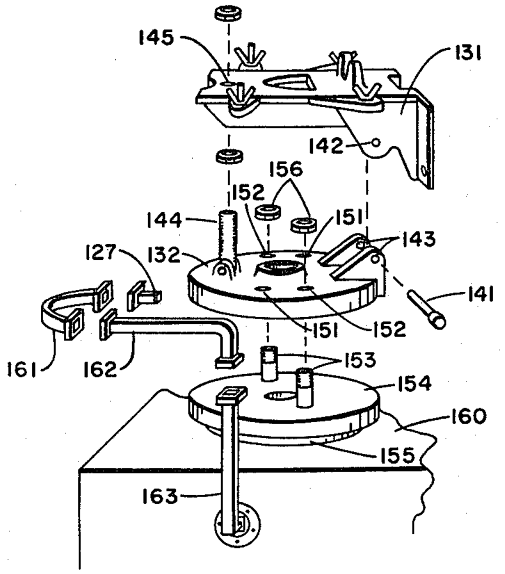

Fig. 11 is a detailed perspective view of one of the antennas represented in Fig. 4, both antennas being of like design and construction; and Fig. 12 is an exploded view of the antenna drive and support and illustrates the manner in which the antenna reflectors may rapidly be adjusted to adapt the system for coverage of both landing directions for a selected runway.

Figure 1:
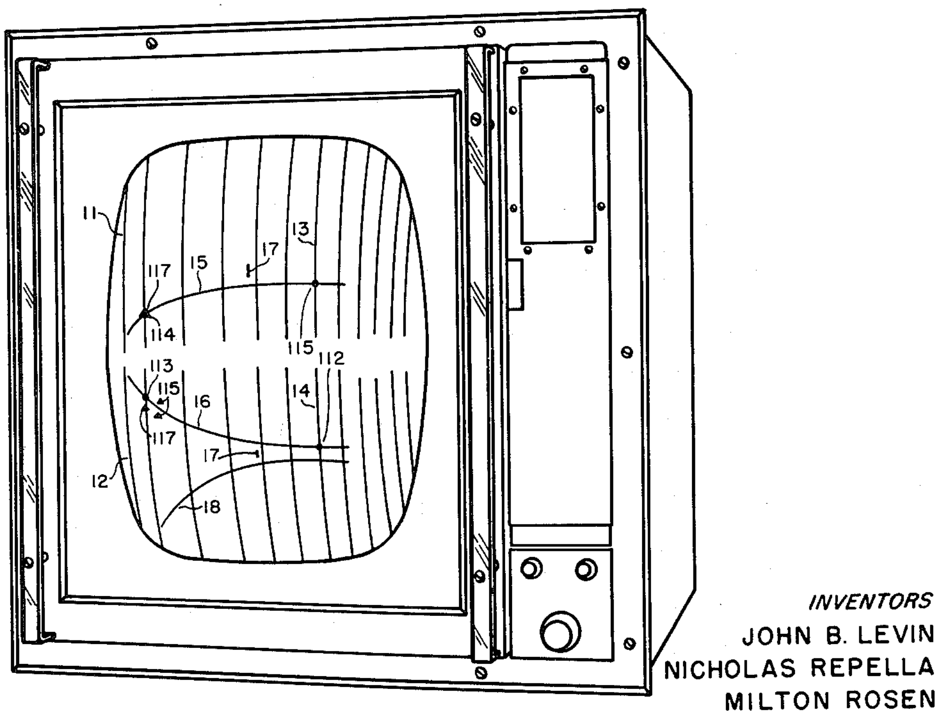
Fig. 1 is a typical precision approach radar beta-scan display.

Referring to Fig. 1, a typical PAR beta-scan display is illustrated with the elevation B-scan display 11 positioned directly above the horizontal display 12 so that each pair of collinear range markers represents the same distance to touchdown. For example, range markers 13 and 14 represent a distance of five miles from touchdown, the interval between range markers being one mile. Course lines 15 and 16 are the computed projection of the glide path in the vertical and horizontal planes respectively. The echo signal 17 from an aircraft executing a typical landing indicates that the aircraft is 2.8 miles from touchdown, above and to the left of the glide path. In the absence of course lines 15 and 16 echo signal 17 is ineffective for determining the relation of the aircraft to the glide path.

Basically, course lines 15 and 16 are generated in the following manner. As will be apparent from the discussion below, the instantaneous angular position of an antenna illuminating a point on the glide path is inversely proportional to the distance therefrom. The nature of the B-scan is such that the rapidly recurring horizontal deflection is related to range; the relatively slowly recurring vertical deflection, to angular position of the radar antenna. In general, solution of the course line equation in one plane requires insertion of different additive and proportionality constants than that for the other plane. In order to display the course lines, a cursor pulse is generated at a time corresponding to the range, functionally related to the instantaneous angular position of the scanning antenna, resulting in intensification of the display screen at this instant. In the computer-solved equation, the rate of change of angle with respect to range is relatively large at short ranges, with the result that successively generated intensifying pulses, which alone would appear as dots, are merged on the display screen to illuminate course lines 15 and 16 adequately for a range that extends for several miles. Where the antenna system rests on or near the runway centerline, the aforementioned rate of change is negligible, and the generated intensifying pulses are so widely spaced on the display screen, that course line 16 is not illuminated. To generate a course line under these circumstances, an auxiliary cursor generator is included in the apparatus for practicing the invention.

Briefly, the invention employs apparatus in combination with other elements of a PAR system having alternately scanning azimuth and elevation antennas. Elevation and azimuth angular positional data signals, derived from the scanning antennas, are biased at a D.-C. level which corresponds to the angular position of the glide path projections in the horizontal and vertical planes with respect to the touchdown point on the runway. One of the biased positional data signals, corresponding to the scanning antenna, is selected in accordance with a gating signal and applied to the computer for controlling the slope of each pulse comprising a signal of sawtooth waveform, each cycle thereof commencing in synchronism with the system trigger pulses initiating a burst of R.-F. energy. Separate potentiometer settings provide elevation and azimuth offset voltages related to the distance between the radar antennas and the touchdown point. One of the offset voltages, alternately selected in accordance with the forementioned gating signal, is compared with the sawtooth signal in a comparator which provides a cursor pulse when the sawtooth signal reaches a level bearing a predetermined relationship to the selected offset voltage. The cursor pulse, coupled to the display tube, intensifies the display screen. When the antenna system is located on or near the runway centerline, operation is unchanged for generation of the course line in the elevation display, but for the azimuth display, the selected azimuth angular positional data signal is applied to the auxiliary cursor generator, where it is biased in accordance with the angular position of the runway centerline in the sector scanned by the azimuth antenna. When the biased signal attains a predetermined level, a gate is opened which permits the ensuing system trigger pulse to initiate generation of a rectangular cursor pulse which persists until shortly before the next system trigger pulse. Application of the rectangular pulse to the display tube illuminates a horizontal line in azimuth display 12 which corresponds to the runway centerline. Switching means are provided to effectively reverse the slope of the azimuth angular positional data signal which controls the slope of the sawtooth pulses when the orientation of the sector searched by the azimuth antenna is substantially reversed. The azimuth presentation then displays course line 18 instead of course line 16 for reasons discussed below.

Figure 2A:
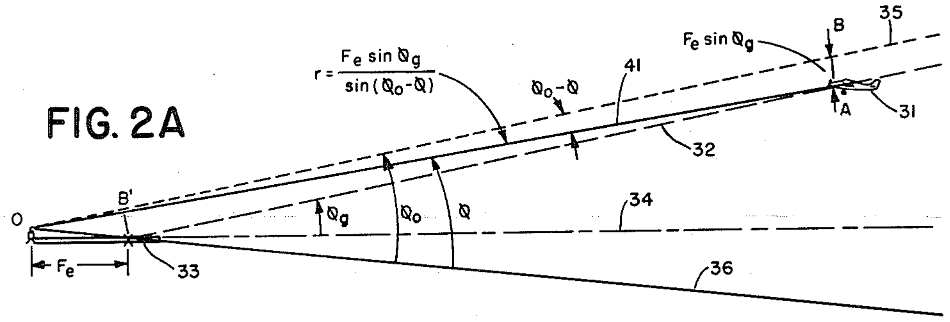
Figs. 2A and 2B are pictorial representations in the vertical and horizontal planes respectively of the geometric relations among the landing aircraft, touchdown point, radar set and runway involved in solving the equations for generating the displayed course lines.
Figure 2B:
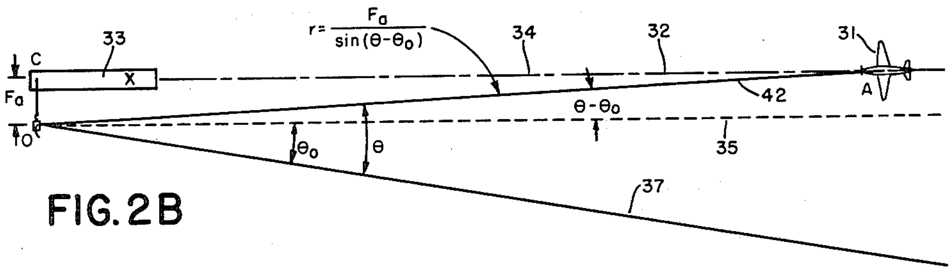

Having described in a general manner the related functions involved in practicing the invention and prior to discussing an example of apparatus for performing these functions, it is appropriate to first consider in detail the nature of the equations to be solved. Referring to Figs. 2A and 2B, elevation and plan views of an aircraft making a typical PAR landing are shown with additional lines constructed to illustrate the geometric relations among the aircraft, radar set and glide path determinative of the equations which the computer must solve in electronically generating the course lines on the display tube. The PAR display of a similar spatial picture is represented in Fig. 1.

The aircraft 31 is shown centered on the glide path 32 which intersects runway 33 at touchdown point X at an angle $\phi_g$ with respect to the ground level represented by runway centerline 34. Since the projection of the glide path in the horizontal plane coincides with runway centerline 34, confusion is avoided by omitting in Fig. 2B the dashed line representation of the glide path 32 seen in Fig. 2A. The site O of the radar antenna system is shown at a typical operating location offset from the runway centerline; however, the novel circuitry discussed below does not preclude its being used successfully when positioned on or near the centerline, should conditions suitable for such operation be present. To simplify determination of course line equations, dotted line 35 is constructed through antenna system site O parallel to glide path 32. Lines 36 and 37 define the lower and clockwise limits respectively of the sectors searched in the elevation and azimuth planes. Lines 41 and 42 are projections of the imaginary line, in the vertical and horizontal planes respectively, joining the radar antenna system at site O to a point on the glide path as illustrated in Fig. 2 by the aircraft 31 at point A. The angle $\phi$ represents the angular position of the elevation antenna when radiating along line 41, referred to its lowest angular position represented by line 36. $\phi_0$ is a measure of the angle subtended by lines 35 and 36 in the vertical plane. The angle $\theta$ is a measure of the angular position of the azimuth antenna with respect to its extreme clockwise position defined by line 37 when radiating along line 42, and $\theta_0$ is the angle subtended by lines 35 and 37. The distance from the antenna site O to the touchdown point X is resolved into two orthogonal components, $F_e$ and $F_a$, respectively parallel and perpendicular to runway centerline 34.

Application of fundamental geometric principles involving the quantities defined above reveals the functional relationship specifying the range at which the glide path is illuminated by an antenna in a particular angular position.

Referring first to the geometry displayed in Fig. 2B, point C is located on runway centerline 42 so that line OC is perpendicular to centerline 34 and equal to the distance $F_a$ defined above. Lines 42 and 35 subtend an angle, $\theta-\theta_0$. Recalling that line 35 was constructed parallel to line 32, it is apparent from the well-known alternate interior angle relationship that angle OAC is also $\theta-\theta_0$. The hypotenuse of right triangle OAC is the range, $r$, to the point A on the course line and equals $$\frac{F_a}{\sin(\theta-\theta_0)}$$

As a practical matter, the angle, $\theta-\theta_0$, is very small, permitting the $\sin(\theta-\theta_0)$ to be replaced by the angle, $\theta-\theta_0$. Hence, the relationship which the computer solves in computing an azimuth course line is:

$$r=\frac{F_a}{\theta-\theta_0}$$

The above relation holds for the geometry shown in Fig. 2B. If sector edge 37 is rotated to lie counterclockwise from line 35, the above equation still applies, recognizing that angle $\theta_0$ measured from sector edge 37, in this case, is negative.

Considering the vertical plane geometry of Fig. 2A, B and B′ are two points on line 35 parallel to glide path 32 chosen so that AB and XB′ are perpendicular to line 35. For illustrative purposes, the height of point O above the ground level, represented by line 34, has been exaggerated. Actually point O is substantially at ground level so that angle XOB′ is substantially equal to angle $\phi_g$ because the respective sides of the two angles are parallel. Then, side XB′ of right triangle XOB′ equals $F_e \sin \phi_g$. Side AB of rectangle ABB′X also equals $F_e \sin \phi_g$. The angle subtended by lines 35 and 41 is $\phi_0-\phi$. Hence, the hypotenuse 41, which is the range, $r$, from the antenna to point A on the glide path, of right triangle OAB is $$\frac{F_e \sin \phi_g}{\sin (\phi_0-\phi)}$$

Recognizing that in practice the angle $\phi_0-\phi$, is small, the functional relation between range and elevation antenna angular position for generation of the elevation plane course line is:

$$r=\frac{F_e \sin \phi_g}{\phi_0-\phi}$$

Rearrangement of terms in the elevation and azimuth course line equations results in:

$$-\phi+\phi_0=\frac{F_e \sin \phi_g}{r},\ \theta-\theta_0=\frac{F_a}{r}$$

Note that each equation is in a form whereby the difference between the instantaneous angular position and a fixed angle is inversely proportional to range.

Figure 3:
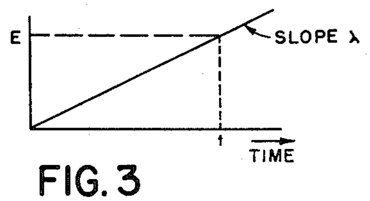
Fig. 3 is a graphical representation of a signal which is a linear function of time.

Having derived the applicable equations and manipulated them into similar forms, it is appropriate to describe an analog computing method suitable for solving both equations by selectively switching input data signals. Referring to Fig. 3, a voltage wave-form is shown plotted as a linear function of time of slope $\lambda$. The time $t$ required for the voltage to rise to a level E is $$\frac{E}{\lambda}$$

Rearranging this equation, it is seen that $$\lambda=\frac{E}{t}$$

Thus far it is not apparent that such a well-known function as a sawtooth wave-form is applicable to solving the above equations. However, note the form of the equation when the slope, $\lambda$, is made proportional to the sum of two voltages; that is, $$ke+ke_0=\frac{E}{t}$$

The elevation and azimuth course line equations are analogous to the above electrical equation with the following analogies:

$$\theta \rightarrow ke \leftarrow -\phi$$
$$-\theta_0 \rightarrow ke_0 \leftarrow \phi_0$$
$$F_a \rightarrow E \leftarrow +F_e \sin \phi_g$$
$$r \rightarrow t \leftarrow r$$

Having discovered the nature of the electrical equation and the need for providing the electrical parameter related to its analogous physical quantity at the appropriate time, the purpose and operation of the apparatus shown in block diagram form in Fig. 4 are more easily understood.

Referring to Fig. 4, the block diagram therein is illustrative of one example of apparatus which applies the underlying concepts of the invention. As background for understanding the interrelated functions therein, the physical connections of the apparatus will first be discussed.

A radar transmitter-receiver 51 alternately energizes elevation antenna 52 and azimuth antenna 53 through R.-F. switch 54, during the interval each antenna scans. The antenna system is preferably of the type described in detail in the above-cited co-pending application wherein the elevation and azimuth antennas are secured to oscillating orthogonal members in a manner whereby each may be detached and resecured so as to radiate in a substantially opposite direction. Portions of this application reproduced below describe this arrangement. The oscillating members are attached to a housing rotatably supported upon a tripod, permitting the antenna system to be rotated through a complete revolution about a vertical axis for the accommodation of landings in any direction.

From elevation resolver 55 and azimuth resolver 56 are derived elevation and azimuth angular positional data signals, related to the instantaneous angular position of the antenna associated with each resolver, for combination in signal data converter 57. The combined data signal from converter 57 is applied to elevation and azimuth D.-C. followers 61 and 62 respectively, comparator 63, and vertical deflection amplifier 64.

Gate source 65 is energized by a gating signal from a cam-actuated microswitch (not shown) synchronized with R.-F. switch 54, actuation of the microswitch coinciding with a change in energization of antennas. This gating signal is united with the combined data signal from converter 57 in vertical deflection amplifier 64 to provide a vertical deflection signal for application to the vertical deflection coils (not shown) in indicator 66.

Gate source 65 converts the input thereto into oppositely-phased azimuth and elevation gating signals for application to apparatus associated with the insertion of azimuth and elevation data respectively into the computer. Azimuth D.-C. follower 62 and azimuth offset data source 67 are disabled except when azimuth antenna 53 is scanning, while elevation D.-C. follower 61 and elevation offset data source 68 are operative only when elevation antenna 53 is scanning.

Comparator 63, flip-flop 71 and multivibrator 72 comprise the auxiliary cursor generator referred to above. A switch (shown in Fig. 7 to be discussed later) permits selection of either the auxiliary cursor generator or azimuth D.-C. follower 62 in connection with the generation of the course line for the azimuth display in accordance with the antenna system location with respect to the runway centerline. When the auxiliary cursor generator has been selected for operation, the signal from gating source 65 allows flip-flop 71 to be set by a pulse from comparator 63, generated when the azimuth antenna is radiating directly along the runway centerline. The setting of flip-flop 71, initiates a multivibrator gating signal. A system trigger pulse, which is applied at terminal 73, when added to the multivibrator gating signal, triggers multivibrator 72 to provide an auxiliary cursor pulse of a time duration slightly less than the interval between system trigger pulses.

The auxiliary cursor pulse is coupled to flip-flop 71, enabling the pulse trailing edge to reset flip-flop 71; and to indicator 66 through video amplifier 69 for providing the azimuth course line by intensifying one horizontal line on the display screen.

A system trigger pulse initiates a cycle of the horizontal deflection signal applied from horizontal deflection signal source 74 to the horizontal deflection coils (not shown) of indicator 66. The nature of the B scan is such that the repetition rate of the horizontal deflection signal is high compared to that of the vertical signal. Hence, there is negligible vertical movement of the display tube electron beam during one period of the horizontal deflection signal and the resultant display is effectively a pattern of horizontal lines, points on each line being of varying brightness in accordance with the intensity modulation provided by video amplifier 69.

For normal operation with the antenna system offset from the runway, driver 81 is alternately energized by azimuth and elevation D.-C. followers 62 and 61 respectively. A system trigger pulse from terminal 73 initiates generation of a cursor gating pulse, which when applied to Miller integrator 75 from cursor gate generator 76 enables integrator 75 to provide as an output a linearly rising voltage derived by charging condenser 77, initially at predetermined voltage, at a constant rate. The voltage, toward which condenser 77 is changing, is the instantaneous voltage at the output of driver 81 which in turn is related to the instantaneous level of the angular positional data signal biased in the azimuth and elevation D.-C. followers to correspond to the location of the selected glide path projections in the azimuth and elevation sectors searched by the antenna system. The linearly rising voltage from Miller integrator 75 is coupled through D.-C. follower 82 to a comparator 83 which supplies an output pulse when the coupled voltage reaches a level determined by either azimuth data source 67 or elevation data source 68 appropriately selected by the gating signal from gate source 65. The data inserted at this point from the later two data sources is related to the distance of the antenna system from the touchdown point. The pulse from comparator 83 is shaped by pulse generator 84 to provide a cursor pulse for intensifying the display screen of indicator 66 after amplification by video-amplifier 69. The cursor pulse is also applied to cursor gate generator 76 to terminate the cursor gating pulse. This disables operation of integrator 75 and rapidly discharges condenser 77, readying it for charge upon the start of the next cursor gating pulse in synchronism with the ensuing system trigger pulse. The resultant output signal from integrator 75 is then a series of pulses comprising a sawtooth waveform, the slope of each pulse therein determined by the instantaneous value of the selected biased angular positional data signal.

The output signal from pulse generator 84 includes a cursor pulse for each sawtooth pulse occurring at a time determined by the slope of the instant sawtooth pulse and the level of the selected offset data signal. The train of cursor pulses intensifies the display screen to produce the course lines in the elevation and azimuth displays.

The discussion of the block-pictorial diagram of Fig. 4 serves to facilitate understanding the detailed explanation of the system operation described in conjunction with a practical example for practicing the invention illustrated by the schematic circuit diagrams of portions of the apparatus in block diagram form in Fig. 4, separated into Figs. 5, 6, and 7 so as not to obscure the connections among circuit elements. Where a terminal in one drawing appears in another, it is designated by the same reference letter in each drawing. Reference numerals appearing in Fig. 4 are retained in Figs. 5, 6 and 7 wherever applicable. The signal waveforms of Figs. 8 and 9, pertinent to the understanding of the system operation, are referred to in the description of circuit operation.

Referring to Fig. 5, the schematic circuit diagrams of azimuth D.-C. follower 62, elevation D.-C. follower 61, driver 81, cursor gate generator 76, and Miller integrator 75 are illustrated. The combined data signal, plotted in Fig. 8A, from signal data converter 57 (Fig. 4) is applied at terminal 91 to grids of tubes V1 and V4 in elevation and azimuth D.-C. followers 61 and 62 respectively through switch S4 and resistors 92 and 93.

This signal provides data determinative of the instantaneous angular position of the beam radiated by the energized antenna as indicated by the appropriately labeled time interval. The combined data signal resulting from a typical complete scanning sequence is illustrated; however, it should be noted that the practice of the invention is not limited by the choice of scanning sequence. The elevation portions of the signal correspond to the angular position $\phi$ of the elevation antenna with respect to line 35 as it traverses the scanned region. The azimuth portions thereof characterize the azimuth antenna angular position $\theta$ measured from line 37, varying over the scanned region. From Fig. 8A, then, it is seen that the sequence begins with the elevation antenna energized and "looking" down. The elevation antenna commences an upward scan for the duration of its search interval, upon termination of which the elevation antenna is deenergized and "looking" up, while the azimuth antenna is energized and "looking" right, prior to scanning toward the left. Completion of the leftward scan during the azimuth search period is accompanied by decoupling the azimuth antenna from and recoupling the elevation antenna to the radar transmitter-receiver. A downward scan of the elevation antenna followed by a left-to-right scan of the azimuth antenna completes the sequence. Inspection of Figs. 8B and 8C reveals that the elevation and azimuth gating signals are oppositely phased, the elevation signal positive during the elevation time intervals, negative for the azimuth intervals. The converse is true for the azimuth gating signal. The waveforms of Figs. 8D and 8E will be discussed in conjunction with circuitry related thereto.

Referring to Figs. 1 and 4, the combined data signal of Fig. 8A added to the gating signal derived from R.-F. switch 54 in vertical deflection amplifier 64 provides a vertical deflection signal which causes the trace on the display tube to follow a pattern corresponding to the antenna search sequence. The trace sweeps upward from the bottom of elevation display 11, during the first elevation interval, drops suddenly to the bottom of azimuth display 12 and sweeps upward during the first azimuth interval. The second elevation interval begins with a sudden shift of the trace from the top of azimuth display 12 to the top of elevation display 11 prior to a downward scan. Finally, the second azimuth interval is initiated when the trace moves from the bottom of elevation display 11 to the top of azimuth display 12 in preparation for a downward scan which terminates the sequence.

The gating signal of Fig. 8B is applied to the grid of tube V2 in Fig. 5 at terminal F. Derivation of this signal obtains by energizing the grid of tube V23 in Fig. 6 with the az.-el. gating signal from the microswitch associated with R.-F. switch 54 of Fig. 4, the plate thereof having the desired gating signal available at terminal F. Since this gating signal is positive during the time interval corresponding to elevation antenna 52 being energized, tube V2 conducts, thereby enablying V1 to be operative as an amplifier during this interval. Potentiomater 94 is effective in setting the D.-C. level of the combined data signal while tube V2 is conductive. Tubes V1, V4, V7, and V8 are directly coupled to enable the D.-C. level of the output signal on the cathode of V8 to be controlled by adjustment of potentiometer 94 during the azimuth interval and by potentiometer 95 for the duration of the azimuth interval. Potentiometer 94 is adjusted in accordance with the selected glide path course angle in the horizontal plane scanned sector. Tubes V7 and V8 comprise driver 81. Tubes V4, V5 and V6 function in elevation D.-C. follower 62 in the same manner as tubes V1, V2 and V3 discussed above with the exception that the gating signal of Fig. 7C, derived from the plate of tube V24 at terminal G, is applied to the grid of V5, thereby enabling V4 to be conductive when the elevation antenna is energized, and potentiometer 95 selects a D.-C. bias for the combined data signal which corresponds to the glide slope angle in the vertical plane of the selected glide path. Both the signals on the respective plates of tubes V4 and V1 are applied to the grid of V7, but only the signal derived from an operative D.-C. follower, as determined by the gating signals, varies the plate voltage of tube V7. A typical signal derived at the output of driver 81 on the cathode of tube V8 by selectively switching the D.-C. bias level of the combined data signal is illustrated in Fig. 8D.

Switches S1A and S1B allow selection of either left hand or right hand operation of the equipment while the orientation of the aircraft echo signal with respect to the course lines observed on the indicator display continues to correspond to the aircraft position relative to the glide path. The method in which this ganged switch functions will be better understood after considering the detailed operation of the system as a whole. Switch S2 selects azimuth D.-C. follower 62 to be operative during the azimuth interval for operation with the antenna system located offset from the runway centerline, but when the antenna system is positioned directly on the runway centerline, operation of the auxiliary cursor generator is selected instead of D.-C. follower 62 during this interval. In Fig. 5, switch S2 is shown in a position whereby azimuth D.-C. follower 62 is operative. To insure faithful reproduction of the combined data signal waveform with a stable bias level, the output signal on the cathode of tube V8 is negatively fed back to azimuth and elevation D.-C. followers 62 and 61 respectively by application of the signal to the grids of tubes V3 and V6 respectively. The biased combined data signal on the cathode of V8 will be referred to in the following discussion of apparatus associated with Miller integrator 75.

In Fig. 9 there is a graphical illustration of signal wave-forms plotted to a common time scale, pertinent to the understanding of the circuitry employed to generate the cursor pulses. The time scale is greatly expanded over that of Fig. 8 because circuit operation in the ensuing description occurs at a rate high compared to that in the discussion immediately above.

Cursor gate generator 76 is seen to be a flip-flop with its set input energized by the system trigger pulses (Fig. 9A) applied at terminal 73, initiating a cursor gating pulse on the plate of tube V12. The cursor gating pulses are illustrated in Fig. 9B. Referring now to Fig. 6, the gating pulse on the plate of tube V11 in Fig. 5 is applied at terminal L to the grid of tube V18 with the negative portion thereof clamped to ground by diode V19. The cursor gating pulse induces conduction in tube V18, and the coupling of its plate voltage to the grid of tube V20 ends conduction in the latter tube at that instant, returning the cathode thereof to a negative potential. In Fig. 5, terminal C1 of capacitor 77 is connected through diode V13 to terminal I, the cathode of tube V20. When tube V20 is conducting, prior to initiation of the cursor gating pulse, terminal C1 of capacitor 77, attached to the grid of V18, is maintained at tube V20 cathode potential by the rapid discharging action through diode V13. The horizontal portions of the waveform in Fig. 9C correspond to this condition. When V20 is suddenly cut off, diode V13 is precluded from conducting and capacitor 77 commences to charge through resistor 96. The potential towards which terminal C1 of capacitor 77 charges is the instantaneous potential on the cathode of tube V8 as determined by the biased combined data signal. Because the initial potential on terminal C1 from which capacitor 77 commences its charge is fixed by the cathode potential of tube V20 in the conductive state, the charge rate in volts per second of capacitor 77 varies directly only with changes in the instantaneous cathode potential on tube V8; hence, the linearly decreasing portion of the waveform in Fig. 9C differs in slope from an adjacent portion in accordance with the aforesaid cathode potential.

The arrangement of tubes V14, V15 and V16 in a Miller integrator type of circuit serves of multiply the effective capacitance of capacitor 77, thereby extending the charging time constant to a value so large compared to the actual period of a charge cycle, that the voltage across capacitor 77, as it charges, is essentially a linear function of time. After amplification and inversion of the signal on the grid of tube V14, the cathode of V16 provides of voltage rising linearly as a function of time, its slope determined by the instantaneous value of the biased combined data signal. The linearly rising voltage available at terminal K of Fig. 5 is applied to the grid of tube V21 in comparator 83. To the grid of V22 in comparator 83 is applied a potential which is related to the distance of the antenna system from the touchdown point.

The following steps illustrate one method of deriving this potential. The setting of potentiometer 101 determines the bias on the grid of V25 in accordance with the distance $F_a$ from the runway centerline to the antenna site. In a similar manner the bias of the grid of V26 is controlled by adjustment of potentiometer 102 subject to the distance $F_e$ from the antenna site along a line parallel to the runway to a location adjacent to the touchdown point. Gating tubes V27 and V28 respectively, energized by the azimuth and elevation gating signals from source 65, are alternately conductive. When tube V27 conducts, the grid of tube V25 rises above cutoff to a potential determined by the setting of potentiometer 101, effectively controlling the plate voltage of tube V25 in the conductive state. Simultaneously, tube V28 is precluded from conducting, resulting in the biasing of tube V26 beyond cutoff. Hence, the voltage applied to the grid of tube V22 in comparator 83 during the azimuth interval is controlled by the setting of potentiometer 101. In a similar manner, the plate voltage of tube V26 controlled by the setting of potentiometer 102 determines the comparison voltage applied to the grid of tube V22 during the elevation interval. When the linearly rising voltage on tube V21 reaches a level determined by the potential on the grid of tube V22, a pluse is generated which is shaped by the circuits embodying tubes V29, V30, V31 and V32 to provide a cursor pulse at terminal 108 for intensifying the display tube screen at a time corresponding to receipt of a radar pulse reflected from the selected glide path. A pulse on the plate of V29 at terminal H is applied through diode V12 to the grid of V11 in Fig. 5, terminating the cursor gating pulse. Upon termination of the cursor gating pulse, V16 becomes conductive and its cathode potential rises, instantaneously discharging capacitor 77 through diode V13 in preparation for another charge cycle.

The phenomena described above are illustrated in Fig. 9 where it is observed that each time the comparator input signal of Fig. 9D rises to a selected level, a cursor pulse (Fig. 9E) is generated which terminates each cursor gating pulse (Fig. 9B), thereby causing the integrator capacitor voltage (Fig. 9C) to suddenly rise to V20 cathode potential.

The Miller integrator, with means for controlling the slope of a rising voltage waveform, together with the comparator, which selects the level to which the aforesaid waveform rises, and generates a pulse coincident therewith, are the heart of the computer. Ordinarily, to perform the separate computations involved in generating the course lines, two separate computing systems would be required. However, arrangement in similar form of the equations to be solved, together with the discovery that the electrical quantities analogous to physical quantities are readily adaptable to selective switching of input data, enables but one system to perform the function of two.

When the course line computer functions as described above, the two curved course lines 15 and 16 of Fig. 1 are generated because with the antenna system offset from the runway, only a portion of the glide path is scanned for a particular angular orientation of an antenna. If the system is located directly on the runway centerline but offset from the touchdown point, the computation problem is unchanged for the elevation display, but a new requirement arises in connection with generation of the course line for the azimuth display; for the azimuth antenna scans the entire glide path in the one angular position whereby radiation of azimuth antenna 53 is directed along the runway centerline. The course line in the azimuth display is then represented by a single horizontal line positioned on the display to correspond to the forementioned angular position. To generate the course line in this case, a novel auxiliary cursor generator is provided.

With reference to Fig. 7 the schematic circuit diagram of the auxiliary cursor generator is illustrated. It is noted that when switch $S_3$ is in the off position, as shown, tube V32 is biased beyond cutoff and precluded from operating. Reversing the setting of switch $S_3$ allows the bias on tube V32 to be set by potentiometer 105, this setting corresponding to the angular position of the selected glide path in that sector of the horizontal plane searched by azimuth antenna 53. The combined data signal from converter 57 applied to the grid of tube V31 in comparator 63 enables an output pulse illustrated in Fig. 8F to be derived on the plate of V32 when the combined data signal reaches a predetermined level in accordance with the setting of potentiometer 105. Tube V33 serves to stabilize the operation of comparator 63.

On terminal C the azimuth gating signal (Fig. 8C) is inserted so that a pulse from comparator 63 is effective in setting flip-flop 71 only when the azimuth antenna is energized. Both a positive and negative pulse are provided on the plate of V32 during each complete scanning sequence, but only the positive pulse is effective in setting flip-flop 71. Hence, one azimuth course line is generated per sequence, phosphor persistence being sufficiently long to maintain course line visibility for a complete sequence. Application of the gating comparator pulse (Fig. 9F) to the grid of tube V35 through diode V34 results in tube V36 being cut off, and the leading edge of the multivibrator gating pulse (Fig. 9G) on the plate thereof being coupled through diode V38 to the grid of tube V39 of monostable multivibrator 72. Tube V40 is then cut off for a period slightly less than the time interval between system trigger pulses. A rectangular pulse, plotted in Fig. 9H, on the plate of V40 is available at terminal E as the auxiliary cursor pulse for intensifying the display tube through video amplifier 69. Coupled through capacitor 106 and diode V40 to the grid of V37, the trailing edge of the auxiliary cursor pulse is effective in resetting flip-flop 71, terminating the multivibrator gating pulse. The effect of the auxiliary cursor pulse is to intensify a horizontal line on the azimuth display corresponding to the period azimuth antenna 53 is radiating directly along the runway centerline.

The foregoing discussion described system operation with the apparatus arranged for "left-hand" operation; that is, the radar antenna system is positioned to the left of the runway centerline as observed from the landing aircraft. When the antenna system is reoriented for "right-hand" operation to accommodate landings from the opposite direction in accordance with the disclosure of the above-cited copending application, it is necessary to reverse the polarity of the elevation angular positional data signal in order to maintain the same up-down and left-right orientations on the elevation and azimuth displays as for "left-hand" operation. This is readily accomplished by reversing the leads of the elevation resolver. The combined data signal derived therefrom is identical to that of Fig. 8A.

Referring to Fig. 1, it is observed that each course line, generated from such a combined data signal, curves to that side of the glide path opposite the antenna location. Hence, course line 15 curves downward in the elevation display while the curvature of course line 16 is to the right (to the top in Fig. 1) for "left-hand" operation when viewed from echo signal 17 in the direction of landing. If the combined data signal of Fig. 8A were employed in generating the course lines 15 and 16, the curvature thereof observed on the display tube would be unchanged from the "left-hand" operation display. Since the antenna system is above the glide path extension for "right-hand" operation also, proper adjustment of potentiometers 95 and 102 results in the generated course line in the elevation display being a correct representation of the vertical plane projection of the glide path. However, the course line in the azimuth display cannot be adjusted to provide the proper curvature towards the left (to the bottom of the display in Fig. 1) required for a proper representation of the glide path horizontal plane projection.

This difficulty is overcome by employing triple-pole double-throw switch S1 to reverse the phase of the azimuth portion of the biased combined data signal on the cathode of tube V8, thereby providing the biased combined signal of Fig. 8F. With this switch in the "right-hand" position course line 18 of Fig. 1, having the proper curvature to the left (to the bottom of the display in Fig. 1) is generated. Switch S1A in Fig. 5 in the Right position selects the oppositely-phased azimuth portion of the combined data signal on the plate of tube V3 for application to the grid of tube V7. When switch S1B is moved to the Right position, the feedback signal from the cathode of tube V8 is removed from the grid of tube V3, which grid is then connected to ground potential. The feedback signal is applied instead to the grid of V1 through switch S1C.

Referring to Figs. 10A and 10B, a diagrammatic representation of the elevation and plan views respectively of runway 33 is shown, together with the sectors scanned by the elevation and azimuth antennas, in order to facilitate explaining changes in the sense of the slope of the angular positional data signals at various points in the system when shifting from left to right hand operation, or vice-versa. The plus and minus symbols, associated with a sector boundary line, characterize the relative level of the angular positional data signal derived when the antenna is radiating along that line, with respect to the data signal derived at a later time when radiation is along the other boundary line of the sector. The uncircled symbols refer to signal waveforms derived from the resolver output and applied to the deflecting means of the display tube, while the encircled symbols relate to the signal waveform applied from driver 81 to Miller integrator 71 in the computer.

In Fig. 10A, sector boundary lines 121 define the sector scanned by elevation antenna 52 for left-hand operation; broken lines 123, for right-hand operation. It is seen that when the antenna is "looking up," the elevation angular positional data signal at all the forementioned system points is of higher potential than when "looking down," for both modes of operation. In Fig. 10B sector boundary lines 122 and 124 define the sectors scanned by azimuth antenna 53 for left and right hand operation respectively. It is to be noted that while for resolver and deflection signals in both types of operation the level of the azimuth data signal when antenna 53 is "looking left" is lower than when "looking right," there is a reversal in the sense of the slope of the azimuth data signal at the output of driver 81 upon changing modes of operation. Hence, for left-hand operation, the level of the azimuth data signal at the output of driver 81 increases as azimuth antenna 53 scans from left to right (positive slope), while for right-hand operation a similar scan produces a signal of decreasing level (negative slope).

The means for reversing the polarity of the signals related to the angular positions of the antennas, together with the means for reversing the polarity of the azimuth portion of the combined data signal effective in controlling the slope of the linearly rising signal, serves to provide a display which maintains the target orientation with respect to horizontal and vertical projections of the glide path the same as in space, regardless of which side of the runway the antenna system is located. This eliminates the possibility of confusing the PAR operator when the landing direction is changed.

The advantages of the apparatus described above will be further appreciated in connection with the simple procedure for adjusting the generated course lines to correspond to the horizontal and vertical projections of the selected glide path. Recalling that the equation related to the azimuth display representation of the glide path is $$\theta-\theta_0=\frac{F_a}{r}$$

and that potentiometers 94 and 101 select voltages respectively analogous to $-\theta_0$ and $F_a$, inquiry into the effect each of the latter potentiometers has on the proper positioning of the course line in the azimuth display reveals additional benefits afforded by selecting this novel method of computing course lines. Differentiation of the angle $\theta$ with respect to the quantities to be adjusted, $-\theta_0$ and $F_a$, shows:

$$\frac{\partial\theta}{\partial\theta_0}=1,\ \frac{\partial\theta}{\partial F_a}=\frac{1}{r}$$

Hence, adjusting the electrical analog of $F_a$ with potentiometer 101 will cause considerably more vertical movement of the course line at short range than at long range while varying the electrical analog of $\theta_0$ with potentiometer 94 effectively moves the entire course line vertically along the face of the display tube. The same effects obtain from adjusting the electrical potentials related to $\theta_0$ and $F_e$ with respect to the elevation display. Utilizing the information discovered above leads to a simple method for accurately aligning the course lines in the elevation and azimuth displays to correspond to the projections of the glide path in the vertical and horizontal planes respectively.

Fundamentally, this procedure involves adjusting the course line to pass through two points on the display corresponding to known points on the glide path projection, one point relatively near the radar antenna system; the other, relatively far therefrom. Since the generated course line is in effect a transformation of a straight line in one coordinate system to a curve in another coordinate system, the curve is oriented with respect to the new coordinate system as the straight line is to the old when two points on the straight line correspond to two points on the curve.

A desirable way of positioning the course line in the azimuth display includes adjusting the potential related to $\theta_0$ until the course line is observed to pass through a distant reference point on the display, known to correspond to a point on the glide path far from the antenna system, followed by setting the potential related to $F_a$ until the course line is seen to intersect a reference point on the display known to correspond to a point on the glide path near the antenna system. The above steps are repeated until both the distant and close reference point are on the course line. This procedure is rapidly convergent because changing the potential related to $F_a$ causes a relatively small movement of the course line with respect to the distant reference point. When positioning the course line in the elevation plane, a similar procedure is followed, first adjusting the potential related to $\phi_0$ followed by setting the potential related to $F_e$.

In describing one method for adjusting the course lines in the embodiment described above, reference will be made to the drawings when helpful in understanding the method. It is evident that numerous variations of this method may be successfully applied, and the following steps serve only to illustrate one such method. The first step involves computing the angles $\phi$ and $\theta$ at which the elevation and azimuth antennas respectively are oriented to illuminate the distant reference point on the glide path. Inspection of Fig. 2 reveals that the angles are readily computed from appropriate insertion of the known data $F_a$, $F_e$, $\theta_0$, $\phi_0$, and the selected distant value of $r$ into the course line equations. Considering a typical example, where $r=6$ miles, $F_a=\frac{1}{4}$ mile, $F_e=1$ mile, and $\phi_g=.05$ radian, $\theta-\theta_0=\frac{1}{24}$ radian and $\phi-\phi_0=.01$ radian. With the radar equipment energized, but not scanning, and calibration switch S4 (Fig. 5) in the Operate position, the antenna drive mechanism is hand-cranked until azimuth antenna 53 is oriented so that $\theta-\theta_0=\frac{1}{24}$ radian, thereby producing a horizontal trace on the azimuth display corresponding to this angle.

In Fig. 5 calibration potentiometer 111, preferably a precision potentiometer like potentiometers 94, 95, 101, 102 and 105 with a calibrated dial for setting the potentiometer to a predetermined point, is connected to provide an accurate calibration voltage which corresponds to a known antenna angular position. When calibration switch S4 is in the Calibrate position, the voltage on the arm of potentiometer 111 is applied to the computer and vertical deflection amplifier 64 (Fig. 4), in place of the combined data signal, to deflect the trace in accordance with the calibration voltage and the sense of the gating signal.

Calibration potentiometer 111 is adjusted until movement of switch S4 between Calibrate and Operate results in no deflection of the trace, thereby determining the azimuth distant reference point setting of potentiometer 111. The antenna mechanism is then hand-cranked until azimuth antenna 53 is angularly oriented to illuminate the touchdown point, a trace being observed on the azimuth display corresponding to this angle and the azimuth close reference point setting of potentiometer 111 is determined by adjusting potentiometer 111 until operation of switch S4 fails to deflect the trace on the azimuth display.

By a similar procedure, with the elevation antenna oriented to illuminate first the touchdown point, and then the distant reference point, elevation close reference point and elevation distant reference point settings of potentiometer 111 are respectively determined.

Having calibrated potentiometer 111, the antenna scanning mechanism is energized, resulting in the display of Fig. 1 appearing on the indicator. Potentiometer 111 is adjusted to the azimuth distant reference point setting and potentiometer 94, its setting corresponding to $\theta_0$ is adjusted while moving switch S4 between Operate and Calibrate until course line 16 intersects distant reference point 112 formed by the intersection of 5-mile range marker 14 and the Calibrate horizontal trace. The Calibrate horizontal traces have not been shown in order to avoid obscuring the essential elements of the display. When such a trace is referred to in this discussion, its appearance on the display as a horizontal line passing through the specified point is easily comprehended. Potentiometer 111 is set at the azimuth close reference point setting and potentiometer 101 is adjusted while operating switch S4 until course line 16 intersects close reference point 113, which is the touchdown point determined by the intersection of the zero range marker and the Calibrate horizontal trace (not shown). This procedure is repeated until the change in potentiometer 101 setting, course line 16 and point 113 intersect without changing the alignment of the course line with respect to point 112.

Alignment of course line 15 is accomplished similarly with potentiometer 95 adjusted until the distant reference point 115, formed by the intersection of range marker 13 and the Calibrate horizontal trace (not shown) with potentiometer 111 at the elevation distant reference point setting, coincides with the course line, followed by adjusting potentiometer 102 to a setting which brings course line 15 through close reference point 114, located at the intersection of the zero range marker and the Calibrate horizontal trace (not shown) with potentiometer 111 at the elevation close reference point setting.

These procedures may be performed on each runway for every landing direction when originally siting the equipment at an airport, noting the settings of each potentiometer for a particular landing direction. Thereafter, the course lines may be readily positioned to accommodate a new landing direction by referring to the predetermined settings. To verify the proper orientation of the course lines, a pair of corner reflectors are symmetrically placed about the runway centerline before the approach edge of the runway and a touchdown corner reflector is placed to one side of the runway adjacent the touchdown point. Properly oriented, course line 16 passes midway between the echo signals 116 from the pair of corner reflectors and to the runway side of the touchdown reflector echo 117 while course line 15 properly positioned is observed to intersect the touchdown reflector echo 117.

With reference to Figs. 11 and 12, antenna structural details which facilitate the rapid reorientation of the antenna system to accommodate landings from the opposite end of the runway will be described. Both the azimuth and elevation antennas 53 and 52 of Fig. 4 are substantially identical in design and construction, and hence are interchangeable. Therefore, it will be understood that whatever is said about the mechanical and electrical characteristics of azimuth antenna 53 in the discussion of Fig. 11 applies equally well to elevation antenna 52 shown in Fig. 4.

Specifically, antenna 53 is formed of a framework of tubular structural elements, this design being chosen for maximum strength, minimum wind resistance, and rigidity, with minimum weight, to facilitate antenna removal and transportation. An endless tubular member 121 defines the outer edge of, and supports the conductive reflecting screen 122, and an outwardly extending tubular framework 123 of generally pyramidal shape functions to support the reflector feed which includes a rectangular horn 124 situated at the reflector focus. Horn 124 is connected by flexible and rigid waveguide sections 125 and 126, respectively, to flexible input waveguide 127. For the purpose of rotating the plane of polarization through 90°, waveguide 126 is formed with a gradual twist 128 through a corresponding angle. The tubular framework, which supports both antenna reflector and feed, converges and is welded to support member 131, which in turn, is pivotally attached to disc-shaped base plate 132.

Details of the means for attaching the antennas so that they may be readily reversed will be better understood from the following discussion of Fig. 12. Specifically, Fig. 12 illustrates support member 131, to which the various tubular struts carrying the antenna reflecting screen and waveguide and horn feed are attached. By means of pin 141, which extends through aligned openings in lugs 142—142, integral with member 131, and through a mating set of protrusions 143—143 on base plate 132, a pivotal connection is obtained. When assembled, bolt 144, attached to plate 132, fits through opening 145 in member 131, and with suitable lock nuts, the angular position of the entire antenna, including feed, may be adjusted with hinge pin 141 as an axis, and then rigidly locked in the selected position. This arrangement thus allows the angular orientation of the radiation pattern of the antenna to be controlled with respect to base plate 132. This adjustment permits tilting azimuth antenna 53 relative to the horizontal plane, and with respect to elevation antenna 52, this adjustment offers means to control the angular displacement of its radiation pattern from a fixed vertical plane.

As illustrated in Fig. 12, base plate 132 is provided with two pairs 151—151 and 152—152 of diametrically opposed circular openings, either pair of which precisely fits diametrically positioned studs 153—153, the latter extending from drive disc 154 which in turn is supported upon housing 160 by bearing plate 155. Housing 160 is the structure represented in Fig. 4 which encloses R.-F. switch 54 and transmitter-receiver 51. As discussed in the above-mentioned copending application, a motor through a transmission imparts oscillatory motion to disc 154; consequently, when base plate 132 is set over studs 153, and fastened down by nuts 156, the entire antenna assembly will cyclically sweep through the predetermined scanning sector.

Although azimuth antenna 53 and elevation antenna 52 are each normally secured to a disc 154, normally the disc to which the azimuth antenna is secured oscillates through a sector of different angular magnitude then does the disc to which the elevation antenna is secured. Typically, the azimuth disc oscillates through a 30° sector, and the comparable disc to which elevation antenna 52 is attached, oscillates through a 10° sector.

The azimuth sector is normally divided with 20° to the runway side of the reference line 35 (Fig. 2B) and 10° on the other side. It will be seen, however, that if, in reversing azimuth antenna 53 to accommodate landings from the opposite direction, base plate 132 is rotated 180° with respect to azimuth disc 154, the oscillations of disc 154 through the same 30° sector would cause antenna 53 to search only a 10° sector on the runway side of reference line 35 and a 20° sector on the other side. To obtain scanning of the desired region, namely, 20° to the runway side of reference line 35, azimuth base plate 132 is accordingly rotated only 170° with respect to its disc 154. The advantages of the provision of two pairs of holes 151—151 and 152—152 in base plate 132 is at once apparent; they permit attachment of base plate 132 to disc 154 in at least two positions, thereby permitting the antenna system to cover the approach regions at both ends of a runway without changing the site. In the present example, the angular spacing between diameters through holes 151—151 and 152—152 is 170°, it being understood that other angular spacings may be used should system site and runway orientation require.

Elevation antenna 52 preferably scans a 10° sector from 1° below the horizontal, whereby the touchdown point is covered, to 9° above the horizontal. However, if in reversing antenna 52, its base plate 132 is rotated 180° with respect to its elevation disc 154, the oscillations of disc 154 through the same 10° sector would cause scanning 9° below the horizontal and 1° above, an obviously undesirable result. To overcome this objection and achieve the preferred searched sector, the base plate 132 to which elevation antenna 52 is attached is rotated only 172° with respect to its corresponding disc 154. Accordingly, the holes 151—151 and 152—152 in the elevation antenna base plate are angularly displaced from each other by 172°.

In a preferred arrangement, azimuth antenna 53 searches a 19° sector to the runway side of reference line 35 and an 11° sector to the opposite side, again a total of 30°. In this case, then, the azimuth base plate 132 is rotated 172° with respect to the horizontal disc 154 in preparation for aircraft landing in the opposite direction on the same runway. Thus, the angular spacing between holes 151—151 and 152—152 of the azimuth base plate 132 is 172°, the same as that in elevation base plate 132 for a 10° sector with above-described asymmetry with respect to the horizontal. Hence, the two antennas are completely interchangeable, resulting in a considerable reduction in fabrication costs and spare parts inventory.

The procedure for reversing the position of antennas 53 and 52 can best be understood by further reference to Fig. 12. Assuming when the antennas have a first orientation that studs 153—153 are secured in holes 152—152 by nuts 156—156 and waveguides 161, 162, 163 and 127 are connected, the first step consists of separating waveguide section 161 from waveguides 127 and 162. Nuts 156—156 are then removed, the antenna is lifted off studs 153—153 and rotated 172° until holes 151—151 are aligned with studs 153—153. After placing holes 151—151 over studs 153—153, nuts 156—156 are again tightened down and the antenna structure reversal is complete. To complete reversal of the feed system, waveguide 162 is separated from waveguide 163, the long section thereof is rotated 180° in the horizontal plane, and guide 162 is resecured to guide 163. Reconnection of waveguide 161 to guide 127 and 162 completes the operation. While the foregoing description has been confined to reversal of the azimuth antenna, the same procedure is followed in changing the position of elevation antenna 52. It is seen that the procedure is relatively simple, and in actual practice, two men have routinely accomplished changeover of both antennas in less than fifteen minutes.

Many advantages of the novel principles embodied in the apparatus described above are now apparent. Employing a single analog computer to generate two course lines by selectively switching input data signals thereto, reliably provides accurately aligned course lines with apparatus comprising a minimum number of components. Initial adjustment of the course line is simple, rapid, and may be generated for "left-hand" or "right-hand" operation of the antenna system. Once having adjusted each potentiometer to position the course lines for a particular landing direction, they may be rapidly reset in these positions, enhancing the compatibility of the computer with a PAR system readily adaptable to land aircraft from a plurality of directions while maintaining the orientation of the displayed aircraft echo with respect to the course lines the same as that of the aircraft to the glide path, thereby presenting the same relative picture to the PAR operator for all landing directions.

It is apparent that numerous modifications of the specific embodiment and variations of the method of adjustment may be made by one skilled in the art without departing from the broad inventive concepts disclosed herein. Consequently, the invention is to be construed as limited only by the spirit and scope of the appended claims.

What is claimed is:

1. In association with a precision approach radar system, apparatus for generating signals related to a predetermined glide path which intersects a touchdown point and is alternately scanned by elevation and azimuth antennas, comprising, means for deriving an angular positional data signal characteristic of the instantaneous angular position of the scanning antenna, means for biasing said data signal in accordance with the position of said glide path in the region scanned by said antennas, a source of sawtooth waveform pulses, means for controlling the slope of each pulse with the biased data signal, means for selecting a reference level related to the distance between said antennas and said touchdown point, and means for generating a cursor pulse when each sawtooth pulse rises to said reference level, each cursor pulse thereby generated being characteristic of the distance from a point on said glide path to the antenna then scanning said point.

2. In a precision approach radar having elevation and azimuth antennas offset from a touchdown point on a runway and alternately scanning orthogonal sectors in the vertical and horizontal planes respectively, apparatus for generating cursor signals related to a predetermined glide path intersecting said touchdown point comprising, means for deriving elevation and azimuth angular positional data signals related to the instantaneous position of each antenna, means for separately biasing said positional data signals in accordance with the position of said glide path in the scanned sectors to provide biased elevation and azimuth data signals, means for selecting each biased signal when its associated antenna is scanning to provide a combined data signal, a source of system trigger pulses, a waveform generator which when energized by said system trigger pulses provides a sawtooth waveform with a slope characteristic of the instantaneous value of said combined data signal, and means for generating a cursor pulse when said sawtooth waveform reaches a predetermined level related to the offset distance between said antennas and said touchdown point.

3. In a precision approach radar system for generating signals characteristic of the spatial position of a predetermined glide path which intersects a touchdown point and is alternately scanned by elevation and azimuth antennas, apparatus comprising, means for deriving elevation and azimuth angular positional data signals characteristic of the instantaneous angular position of said elevation and azimuth antennas respectively, a source of a gating signal characteristic of which antenna is scanning, elevation and azimuth biasing amplifiers alternately selected for operation by said gating signal in synchronism with the scanning of the respective antenna for alternately biasing said elevation and azimuth signals to correspond to the angular position of the projections of said glide path in the vertical and horizontal planes respectively, a source of sawtooth pulses which recur at a rate high compared to the scanning rate of said antenna, means for controlling the slope of each sawtooth pulse with the biased signal from the selected biasing amplifier, means for alternately selecting in response to said gating signal elevation and azimuth reference levels characteristic of elevation and azimuth orthogonal components of the distance between said antennas and said touchdown point in synchronism with scanning of the respective antenna, and means for providing a cursor pulse when each sawtooth pulse rises to the selected reference level.

4. In a precision approach radar adaptable for landing aircraft from either one of substantially opposite approach regions of a runway, a system for generating signals characteristic of the spatial position in the scanned region of a predetermined glide path which intersects a touchdown point and is alternately scanned by elevation and azimuth antennas attached to respective oscillating members, which includes apparatus comprising, means for attaching said antennas to said members in a manner whereby said antennas may be substantially reversed for scanning the opposite approach region, means for deriving elevation and azimuth angular positional data signals characteristic of the instantaneous angular position of said elevation and azimuth antennas respectively, a source of a gating signal characteristic of which antenna is scanning, switching means for reversing the sense of the slope of said azimuth data signal when said antennas are reversed, elevation and azimuth biasing amplifiers alternately selected for operation by said gating signal in synchronism with the scanning of the respective antenna for alternately biasing said elevation and azimuth signals at levels respectively characteristic of the angular position of the projections of said glide path in the vertical and horizontal planes, a source of sawtooth pulses which recur at a rate high compared to the scanning rate of said antennas, means for controlling the slope of each sawtooth pulse with the biased signal from the selected biasing amplifier, means for alternately selecting in response to said gating signal, elevation and azimuth reference levels characteristic of elevation and azimuth orthogonal components of the distance between said antennas and said touchdown point in synchronism with scanning by the associated antenna, and means for providing a cursor pulse when each sawtooth pulse rises to the selected reference level, the time at which each cursor pulse is generated being characteristic of the distance between said antennas and the point on said glide path then scanned.

5. In a precision approach radar adaptable for landing aircraft from either of substantially opposite approach regions of a runway, a system for generating signals characteristic of the spatial position in the scanned region of a predetermined glide path which intersects a touchdown point and is alternately scanned by elevation and azimuth antennas attached to respective oscillating members, which system includes means for attaching said antennas to said members in a manner whereby said antennas may be substantially reversed for scanning either of said approach regions, means for deriving elevation and azimuth angular positional data signals characteristic of the instantaneous angular position of said elevation and azimuth antennas respectively, a source of a gating signal characteristic of which antenna is scanning, elevation and azimuth biasing amplifiers alternately selected for operation by said gating signal in synchronism with the scanning of the respective antenna for alternately biasing said elevation and azimuth signals at levels respectively characteristic of the angular position of the projections of said glide path in the vertical and horizontal planes, a source of sawtooth pulses which recur at a rate substantially higher than the scanning rate of said antennas, means for reversing the sense of the slope of the biased azimuth data signal when said antennas are reversed, means for controlling the slope of each sawtooth pulse with the biased data signal from the selected biasing amplifier, means for alternately selecting in response to said gating signal, elevation and azimuth reference levels characteristic of elevation and azimuth orthogonal components of the distance between said antennas and said touchdown point in synchronism with scanning by the associated antenna, means for providing a cursor pulse when each sawtooth pulse rises to the selected reference level, the time at which each cursor pulse is generated being characteristic of the distance between said antennas and the point on said glide path then scanned, a cathode ray tube having associated vertical and horizontal deflecting means and a control electrode for controlling the intensity of the electron beam therein, a vertical deflection signal generator energized by said elevation and azimuth data signals and said gating signal which provides a vertical deflection signal as an output, the sense of the slope of said elevation and azimuth data signals applied to said vertical deflection signal generator remaining unchanged when said antennas are reversed, a horizontal deflection signal generator which generates a horizontal deflection pulse in response to each system trigger pulse to provide a horizontal deflection signal, means for coupling said vertical and horizontal deflection signals to said vertical and horizontal deflecting means respectively, and means for coupling said cursor pulses to said control electrode, thereby providing on the face of said cathode-ray tube a visual display of the vertical and horizontal plane projections of said glide path.

6. In association with a precision approach radar system, apparatus for generating signals related to a predetermined glide path which intersects a touchdown point and is alternately scanned by elevation and azimuth antennas respectively secured to azimuth and elevation oscillating members comprising, means for detaching from and resecuring to the respective oscillating members said elevation and azimuth antennas in a manner whereby said antennas may scan one of two substantially opposite regions, means for deriving elevation and azimuth angular positional data signals respectively characteristic of the instantaneous angular position of said elevation and azimuth antennas, means for reversing the sense of the slope of said azimuth data signal when said antennas are reversed to scan the opposite region, means for biasing said data signals in accordance with the position of said glide path in the region scanned by said antennas, a source of sawtooth waveform pulses, means for controlling the slope of each sawtooth pulse with the biased data signals, means for selecting a reference level related to the distance between said antennas and said touchdown point and means for generating a cursor pulse when each sawtooth pulse rises to said reference level, each cursor pulse thereby generated being characteristic of the distance from a point on said glide path to the antenna then scanning said point.

7. In a precision approach radar system having elevation and azimuth antennas offset from a touchdown point by a distance resolvable into elevation and azimuth orthogonal components and alternately scanning sectors in the vertical and horizontal planes respectively, apparatus for visually displaying the vertical and horizontal plane projections of a selected glide path which intersects said touchdown point at predetermined glide and course angles in the vertical and horizontal planes respectively comprising, a source of elevation and azimuth angular positional data signals respectively characteristic of the angular position of said elevation and azimuth antennas, a source of a gating signal characteristic of which antenna is scanning, a gating source energized by said gating signal which provides as oppositely phased output signals elevation and azimuth gating signals having the same selected polarity when the associated antenna is scanning, means for combining said elevation and azimuth angular positional data signals to provide a combined data signal, elevation and azimuth D.-C. followers each with a signal input jointly energized by said combined data signal and a switching input energized respectively by said elevation and azimuth gating signals, enabling a D.-C. follower to be operative only when the antenna associated therewith is scanning, means for biasing said combined data signal in said elevation and azimuth D.-C. followers at levels respectively characteristic of said glide and course angles, a source of system trigger pulses recurring at one line period time intervals, a cursor gate generator responsive to each system trigger pulse for providing cursor gating pulses, each cursor gating pulse having a duration less than said line period, a capacitor in combination with associated resistance having a charge time constant long compared to said line period and a charge time constant short compared to said line period, means for charging said capacitor for the duration of said cursor gating pulse to provide a sawtooth voltage pulse, means for charging said capacitor to a fixed level upon the termination of each cursor gating pulse, a comparator energized by said sawtooth pulses and having means for alternately selecting elevation and azimuth reference levels respectively characteristic of said elevation and azimuth orthogonal components and which provides a cursor pulse when the level of each sawtooth pulse equals the selected reference level, a cathode ray tube having elevation and azimuth displays thereon and means for coupling said cursor pulses to said cathode ray tube to provide visual display of the vertical and horizontal projections of said glide path in said elevation and azimuth displays respectively.

8. In a precision approach radar having elevation and azimuth antennas offset from a touchdown point on a runway by a distance resolvable into elevation and azimuth orthogonal components, means for alternately scanning orthogonal sectors in the vertical and horizontal planes with said elevation and azimuth antennas respectively, means for deriving elevation and azimuth angular positional data signals characteristic of the position of said antennas, and means for deriving a gating signal which changes level in synchronism with a change in selection of the antenna to scan; apparatus for generating cursor signals related to a glide path of predetermined course angle and elevation angle terminating at a touchdown point comprising, elevation and azimuth differential amplifiers each with an output and a signal and feedback input, means for coupling said elevation and azimuth data signals to the signal inputs of said elevation and azimuth differential amplifiers respectively, means for adjusting the bias on the signal inputs of said elevation and azimuth differential amplifiers respectively to correspond to said glide and course angles respectively, associated with each differential amplifier switching means energized by said gating signal which enables each differential amplifier to be operative only when an antenna associated therewith is scanning, a driver amplifier energized by the outputs of said elevation and azimuth amplifiers for providing a combined data signal, means for coupling said combined data signal to the feedback inputs of said elevation and azimuth differential amplifiers, a source of system trigger pulses, a cursor gate generator which responds to each system trigger pulse by providing cursor gating pulse whose duration is less than the time interval between system trigger pulses, a capacitor and associated switching means energized by each cursor gating pulse for charging said capacitor for the duration of said cursor gating pulse at a substantially constant rate determined by said combined data signal to provide a sawtooth pulse for each system trigger pulse, elevation and azimuth offset data amplifiers each with an input, cutput and associated switching means energized by said gating signal in a manner which enables only that one of said offset data amplifiers associated with the scanning antenna to be operative, means for biasing the inputs of said elevation and azimuth offset data amplifiers in a manner charcteristic of said elevation and azimuth orthogonal components respectively, a comparator with a reference input energized by the output of the operative offset data amplifier and a signal input energized by each sawtooth pulse appropriately coupled thereto for providing a cursor pulse when each sawtooth pulse reaches a level determined by the reference input signal, a cathode ray tube with a control electrode for controlling the intensity of an electron beam deflected by vertical and horizontal deflecting means, means for coupling said combined angle signal and said gating signal to said vertical deflecting means, a source of range deflection pulses triggered by said system trigger pulses for providing a range pulse for each trigger pulse, means for coupling said range pulses to said horizontal deflecting means, and means for coupling said cursor pulses to said control electrode, thereby providing a visual representation of the vertical and horizontal projections of said glide path.

9. In a precision approach radar system having elevation and azimuth antennas offset from a touchdown point by a distance resolvable into elevation and azimuth orthogonal components and alternately scanning sectors in the vertical and horizontal planes respectively of an approach region, apparatus for visually displaying the vertical and horizontal plane projections of an aircraft with respect to a selected glide path which intersects said touchdown point at predetermined glide and course angles comprising, a radar transmitter-receiver which provides a target signal characteristic of reflected energy from an aircraft, an R.-F. switch for coupling said transmitter-receiver to the antenna which is scanning, elevation and azimuth resolvers attached to said elevation and azimuth antennas which provide respectively elevation and azimuth angular positional data signals characteristic of the instantaneous angular position of each antenna, a source of a gating signal derived from the position of said R.-F. switch characteristic of which antenna is scanning, means for combining said elevation and azimuth angular positional data signals to provide a combined data signal, a gating source energized by said gating signal which provides as oppositely phased output signals elevation and azimuth gating signals which are positive in polarity when the associated antenna is scanning, elevation and azimuth D.-C. followers each with a signal input jointly energized by said combined data signal and a switching input energized respectively by said elevation and azimuth gating signals, enabling a D.-C. follower to be operative only when the antenna associated therewith is scanning, means for biasing said combined data signal in said elevation and azimuth D.-C. followers to correspond to said glide angle and said course angle respectively, a driver energized by the output signals from said elevation and azimuth D.-C. followers to provide as an output a biased combined data signal, means for negatively feeding back said biased combined data signal to each D.-C. follower, a source of system trigger pulses recurring at one line period time intervals, a cursor gate generator responsive to each system trigger pulse for providing cursor gating pulses, the width of each pulse being less than said line period, a Miller integrator, operative in response to each cursor gating pulse for the duration thereof, and providing a signal output which rises linearly as a function of time at a rate controlled by said biased combined data signal, elevation and azimuth D.-C. amplifiers, each with a switching input respectively energized by said elevation and azimuth gating signals, means for setting the bias of said elevation and azimuth D.-C. amplifiers to be respectively characteristic of said elevation and azimuth orthogonal components, a comparator with two inputs, means for coupling the output of the D.-C. amplifier whose associated antenna is scanning to one input of said comparator as a reference signal, means for coupling the linearly rising signal from said Miller integrator to the other input of said comparator which provides a cursor pulse when said linearly rising signal rises to a level bearing a predetermined relation to said reference signal, a video amplifier, means for coupling both said target signal from said transmitter-receiver and said cursor pulses to said video amplifier, a cathode-ray tube with a control electrode for varying the intensity of an electron beam which is deflected by vertical and horizontal deflectng means, a source of a vertical deflection signal derived from combining said combined data signal with said gating signal, means for coupling said vertical deflection signal to said vertical deflecting means, a horizontal deflection signal source which provides a horizontal deflection pulse in response to each system trigger pulse, means for coupling said horizontal deflection signal to said horizontal deflecting means, means for coupling the output signal of said video amplifier to said control electrode, thereby providing on the face of said cathode ray tube a visual display of the projections in the vertical and horizontal planes of the position of said aircraft with respect to said glide path, the vertical and horizontal plane projections of said glide path displayed as elevation and azimuth course lines respectively.

10. Apparatus as in claim 9 with means for substantially reversing said antennas so as to scan a region substantially opposite to said approach region, means for reversing the polarity of said elevation angular positional data signal derived from said elevation resolver and means for inverting the sense of the slope of the azimuth portion of said combined data signal, said apparatus thereby providing a visual display of the projections of said glide path when said antennas are substantially reversed.

11. Apparatus as in claim 9 with means for replacing operation of said azimuth D.-C. follower when said azimuth antenna is scanning with an auxiliary cursor generator comprising, a comparator energized by said combined data signal and having means for setting a reference level characteristic of said course angle, said comparator providing an output pulse when said combined angle signal rises to said reference level, a flip-flop which is set when energized simultaneously by the positive portions of said azimuth gating signal and the comparator output pulse, a multivibrator triggered by an output pulse from said flip-flop to provide an auxiliary cursor pulse whose duration is less than said line period, means for resetting said flip-flop with the trailing edge of said auxiliary cursor pulse, means for coupling said auxiliary cursor pulse to said video amplifier thereby providing a horizontal line on said display tube which is characteristic of the projection of said glide path in the horizontal plane when said antennas are located substantially on the runway centerline.

12. Apparatus as in claim 9 which includes a source of calibration potential adjustable to correspond to selected antenna angular positions, range markers on the face of said cathode ray tube for comparison with said target signal displayed thereon to determine the distance between said aircraft and said touchdown point, means for selecting said calibration potential as an input signal to said source of a vertical deflection signal instead of said combined data signal to provide a horizontal trace on said cathode ray tube corresponding to an antenna angular position, means for selecting azimuth and elevation distant and close settings of said calibration potential which correspond to the angular position of said elevation and azimuth antennas respectively when scanning respective predetermined distant and close points on said glide path, thereby providing a visual indication of calibration points which are the vertical and horizontal projections of said reference point where said range marker, characteristic of the distance between the respective reference point and said touchdown point, intersects said horizontal trace, with said calibration potential adjusted to the respective setting, enabling said bias levels in said D.-C. followers and said reference signals applied to said comparator to be adjusted until each calibration point coincides with a course line so that said elevation and azimuth course lines are accurate representations respectively of the vertical and horizontal plane projections of said glide path.

13. In association with a precision approach radar system having a cathode ray tube with elevation and azimuth displays thereon, apparatus for generating signals related to a predetermined guide path, which intersects a runway touchdown point at a glide angle and course angle in the vertical and horizontal planes respectively, and is alternately scanned by elevation and azimuth antennas, comprising, means for deriving elevation and azimuth angular positional data signals characteristic of the instantaneous angular position of the respective antennas, means for respectively biasing the elevation and azimuth data signals at levels respectively characteristic of said glide angle and said course angle, a source of sawtooth waveform pulses, means for selecting the biased data signal whose respective antenna is scanning, means for controlling the slope of each sawtooth pulse with the selected biased data signal, means for setting reference levels respectively characteristic of elevation and azimuth orthogonal components of the distance between said antennas and said touchdown point, means for selecting the one of said reference levels whose respective antenna is scanning, a comparator energized by said selected reference level and said sawtooth pulses for providing a cursor pulse as an output when each sawtooth pulse rises to the selected level, means for applying said cursor pulses to said cathode ray tube display to provide a visual representation of the vertical and horizontal plane projections of said glide path respectively in said elevation and azimuth displays.

14. Apparatus in a precision approach radar for generating signals characteristic of the vertical and horizontal projections of a selected glide path which intersects a runway touchdown point at a glide angle and course angle in the vertical and horizontal planes respectively comprising, elevation and azimuth antennas which alternately scan intersecting sectors in the vertical and horizontal planes, means for generating elevation and azimuth angular positional data signals which are characteristic of the angular position of the respective antennas, means for biasing said elevation and azimuth angular positional data signals at a level respectively characteristic of said glide and course angles, a source of system trigger pulses recurring at a rate high compared to the scanning rate of said antennas, means for generating a sawtooth pulse in response to each system trigger pulse, means for selecting the biased angular posional data signal associated with the scanning antenna, means for controlling the slope of each sawtooth pulse with the selected angular positional data signal thereby providing alternating elevation and azimuth series of sawtooth pulses, the slope of each pulse in said series characteristic of the respective combinations of said glide angle with the angular position of said elevation antenna and said course angle with the angular position of said azimuth antenna, means for setting elevation and azimuth reference levels respectively characteristic of elevation and azimuth orthogonal components of the distance between said antennas and said touchdown point, means for selecting the one of said reference levels associated with the scanning antenna, means for comparing each sawtooth pulse with the selected reference level to provide a cursor pulse when each sawtooth pulse rises to said selected reference level, the time interval between said cursor pulse and the system trigger pulse immediately precedent being equal to twice the time required for a radar pulse to travel from the scanning antenna to the point on said glide path then scanned, a display tube having azimuth and elevation displays with ordinates thereof corresponding to angular positions of said azimuth and elevation antennas and abscissa thereof corresponding to range, and means for applying said cursor pulses to said display tube for visually displaying the vertical and horizontal projections of said glide path in said elevation and azimuth displays respectively.

15. An auxiliary cursor generator in a precision approach radar system with alternately scanning elevation and azimuth antennas located on a runway centerline comprising, means for deriving an azimuth angular positional data signal characteristic of the angular position of said azimuth antenna, means for setting a reference level characteristic of the angular position of said runway centerline in the sector scanned by said azimuth antenna, means for generating a comparison pulse when said azimuth angular positional data signal rises to said reference level, a flip-flop set by said comparator pulse when said azimuth antenna is scanning, thereby initiating a gating pulse, a source of system trigger pulse separated in time by one line period, a monostable multivibrator triggered by a system trigger pulse only during the interval of a multivibrator gating pulse to provide an auxiliary cursor pulse whose duration is less than one line period, and means for applying said auxiliary cursor pulse to said cathode ray tube display thereby providing a visual display of said runway centerline in said azimuth display when said antennas are located on said runway centerline.

16. Analog computing apparatus comprising, means for deriving a data signal characteristic of the instantaneous value of a first quantity, means for biasing said data signal in accordance with a selected value of said first quantity, a source of sawtooth waveform pulses, means for controlling the slope of each pulse with said biased data signal, means for selecting a reference level related to a selected fixed value of a second quantity, and means for determining the time interval for each sawtooth pulse to rise to said reference level, said time interval being characteristic of the ratio of said second quantity to an algebraic combination of said instantaneous and selected first quantity values.

17. Analog computing apparatus comprising, means for deriving a data signal characteristic of the contemporary value of a first quantity, a source of sawtooth waveform pulses, means for controlling the slope of each pulse with a signal related to said data signal, means for selecting a reference level related to the value of a second quantity, and means for determining the time interval for each sawtooth pulse to rise to said reference level, said time interval being related to the ratio of said second and first quantities.

18. In association with a precision approach radar system, apparatus for generating signals related to a predetermined space path which intersects a selected point and is scanned by first and second antennas, said apparatus comprising, means for deriving a positional data signal characteristic of the instantaneous position of the scanning antenna, means for biasing said data signal in accordance with the position of said space path in the region scanned by said antennas, a source of sawtooth waveform pulses, means for controlling the slope of each pulse with the biased data signal, means for selecting a reference level related to the distance between said antennas and said selected point, and means for presenting an indication of the time each sawtooth pulse rises to said reference level, each time thus indicated being characteristic of the distance from a point on said space path to the antenna then scanning the latter point.

19. In association with a radar system, apparatus for generating signals related to a predetermined space path which intersects a selected point and is scanned by an antenna, said apparatus comprising, means for deriving a positional data signal characteristic of the instantaneous position of the scanning antenna, means for biasing said data signal in accordance with the position of said space path in the region scanned by said antenna, a source of sawtooth waveform pulses, means for controlling the slope of each pulse with the biased data signal, means for selecting a reference level related to the distance between said antenna and the selected point, and means for presenting an indication of the time each sawtooth pulse rises to said reference level, each time thus indicated being characteristic of the distance from said antenna to a point on said space path then scanned.

References Cited in the file of this patent

UNITED STATES PATENTS 2,741,761 Franke ---------------- Apr. 10, 1956

UNITED STATES PATENT OFFICE

CERTIFICATION OF CORRECTION

Patent No. 2,964,745 December 13, 1960

John B. Levin et al.

It is hereby certified that error appears in the above numbered patent requiring correction and that the said Letters Patent should read as corrected below.

Column 7, line 32, for "later" -- latter --; column 8, line 60, for "Potentiomater" read -- Potentiometer --; column 10, line 4, for "of", second occurrence, read -- to --; line 11, for "of", first occurrence, read -- a --; same column 10, line 43, for "pluse" read -- pulse --; column 13, line 3, for "az muth" read -- azimuth --; line 25, for "d splay" read -- display --; same column 13, line 41, for "d scovered" read -- discovered --; column 23, line 44, for "guide" read -- glide --.

Signed and sealed this 30th day of May 1961.

(SEAL)
Attest:

ERNEST W. SWIDER
Attesting Officer

DAVID L. LADD
Commissioner of Patents